Dec. 27, 1927.
P. VERDUGT
WAGON END GATE
Filed March 21, 1927
1,654,439
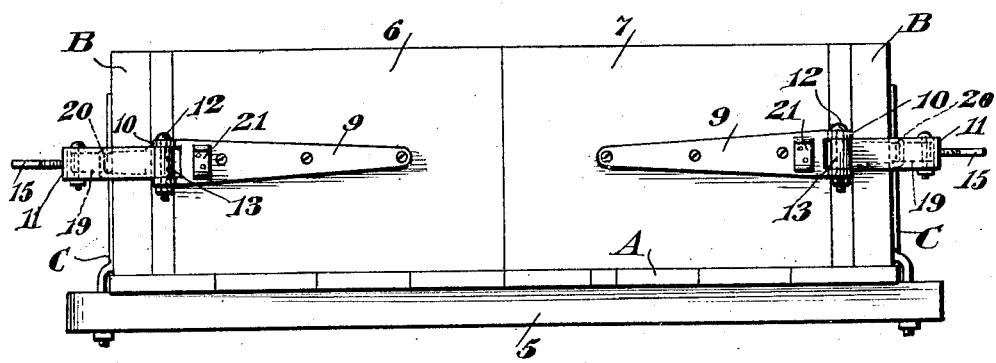
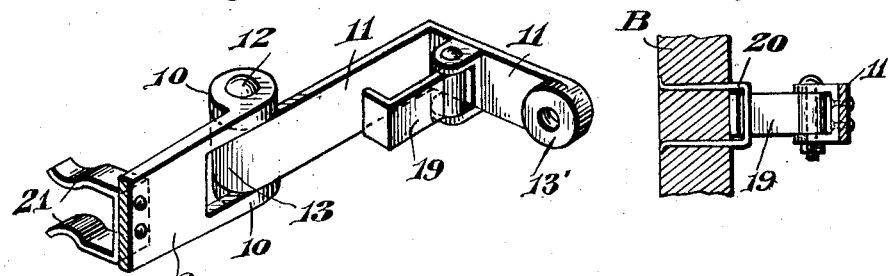
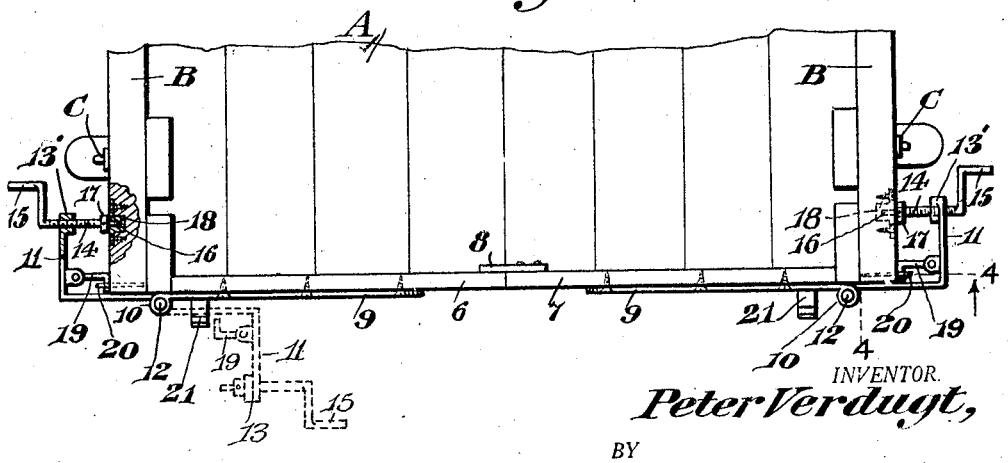
INVENTOR.
Peter Verdugt,
BY
Geo. P. Kimmel
ATTORNEY.

Patented Dec. 27, 1927.

1,654,439

UNITED STATES PATENT OFFICE.

PETER VERDUGT, OF ST. LAWRENCE, SOUTH DAKOTA.

WAGON END GATE.

Application filed March 21, 1927. Serial No. 177,113.

The invention relates primarily to an end gate for wagon bodies, and more particularly to the class of combined end gates and fastening means therefor.

The primary object of the invention is the provision of an end gate of this character, wherein the same can be readily and easily applied to the rear open end of a wagon body and in that position will retain the load of said body, without liability of the end gate working loose or becoming detached from the body, the gate being capable of swinging movement to open position, when it is desired to discharge the load of the wagon body from the rear end thereof.

Another object of the invention is the provision of an end gate of this character, wherein the same can be fastened to the side boards of a wagon body to firmly and securely secure the gate in closing position, yet the sections of said gate can be swung open at the option of the user of the wagon body and also completely detached from the wagon body when use thereof is not required.

A further object of the invention is the provision of an end gate of this character, wherein the fasteners for the same to secure the sections of the gate in position upon the wagon box are of novel form, so that the side boards of the wagon body will be prevented from spreading due to the load and the sections of the gate swingingly supported and detachable from the wagon body.

A still further object of the invention is the provision of an end gate of this character, which is extremely simple in construction, readily and easily applied to a wagon body, thoroughly reliable and efficient in its purposes, strong, durable, removable from the wagon body with dispatch, and inexpensive to manufacture.

With these and other objects in view, the invention consists in the features of construction, combination and arrangement of parts, as will be hereinafter more fully described in detail, illustrated in the accompanying drawing showing the preferred embodiment of the invention, and pointed out in the claims hereunto appended.

In the accompanying drawing:—

Figure 1 is an elevation of the rear end of a wagon body, showing the end gate constructed in accordance with the invention applied and its sections closed.

Figure 2 is a fragmentary top plan view of the rear end of the wagon body showing the end gate applied and closed, one of the fasteners of the gate being shown by dotted lines in releasing position.

Figure 3 is a fragmentary perspective view of one of fasteners for the end gate.

Figure 4 is a fragmentary sectional view on the line 4—4 of Figure 2 looking in the direction of the arrow.

Similar reference characters indicate corresponding parts throughout the several views in the drawing.

Referring to the drawing in detail, A designates generally the rear end portion of a wagon body or box, which is equipped with sides or side boards B as usual. On the outer faces of the sides or side boards B are mounted the strips or stanchions C, the latter being fastened to the sides in any suitable manner and to the cross floor sill 5 as usual to hold the sides or side boards B in their upright position.

Removably fitted upon the wagon body or box A at its rear open end is the end gate constituting the present invention comprising preferably a pair of complementary sections 6 and 7, respectively, each being of board like style, and at the inner meeting ends of said sections is a parting or abutment strip 8, the same being fastened to the inner face of one section and designed to overlap the other section to close the meeting ends of said sections when the gate is in closing position relative to the rear open end of the wagon body or box A as will be apparent. If desired the end gate may be in the form of a single board.

Carried by each gate section 6 and 7, preferably at an intermediate point between its top and bottom edges and longitudinally disposed at the outer face of said section is a hinge strap 9 formed with outer spaced pintle ears 10 which extend slightly beyond the outer ends of said sections for swingingly connecting between said ears 10 a substantially L-shaped bracket 11, through the medium of a pintle 12 passed through the ears 10 and also through a pintle sleeve 13 formed at the extremity of the arm of said bracket 11 next to the strap 9. The bracket 11 at the free end of its other arm has threaded therein, preferably through a boss 13′ formed on said bracket, a binding or clamping screw 14 the outer end of which is formed with a hand crank 15, while its non-threaded inner end forms what might be termed a dowel extremity 16 surrounded by an inset annular shoulder 17 formed on said screw. This extremity 16 is adapted for detachable engagement in a socket member 18 embedded in and fastened to the side or side board B of the wagon body A at the outer face thereof.

It will be apparent that the bracket 11 can be clamped to the side or side board B by the screw 14. The arm of the bracket 11 carrying the screw 14 has pivotally connected at its inner side a catch or latch 19 which is adapted for detachable engagement in a keeper or staple 20 carried by the side or side board B. In this manner the bracket 11 is detachably engaged with the side or side board B of the wagon body or box A and by manipulating the screw 14 the end gate sections and the side or board B can be firmly and securely clamped together without any liability of the spreading of the side or side board B when subjected to a load carried by the body A.

In the mounting of the sections 6 and 7 of the end gate as hereinbefore explained it will be apparent that said sections can be swung to open position and also closed in a convenient manner as said sections are swingingly hinged to the brackets 11 of the fasteners as will be apparent from Figures 1 and 2 of the drawing.

On the outer side of the hinge leaf 9 at the desired point is mounted a spring clip 21 with which is adapted to engage the bracket 11 for detachably retaining the same when said bracket has been swung outwardly and inwardly to releasing position from the side or side board B of the body A, thereby retaining the bracket to prevent free swinging of the same when the end gate has been removed from the wagon body, this position of the bracket just described, being shown by dotted lines in Figure 2 of the drawing.

It is of course understood that when the sections 6 and 7 of the end gate have been brought to closed position relative to the rear open end of the wagon body or box A the said sections can be fastened or closed in any desirable manner, this being no part of the present invention, as any conventional type of fastening device can be employed for the purpose named.

It will be apparent that the sections 6 and 7 of the end gate can be opened and closed at will and also said end gate completely detached from the wagon body or box A at the option of the user thereof.

It is to be understood that changes, variations and modifications may be made in the end gate and the mounting thereof including the fasteners, as come properly within the scope of the appended claims without departing from the spirit of the invention or sacrificing any of its advantages.

From the foregoing it is thought that the construction and manner of operation and use of the end gate and fasteners therefor will be clearly understood and therefore a more extended explanation has been omitted.

What is claimed is:—

1. An end gate for use with wagons having sides and comprising a gate body adapted to fit between the sides, hinge leaves fixed to the gate body at opposite ends thereof, substantially L-shaped brackets hinged to the leaves and adapted to swing to position to overlap the sides, adjustable means carried by the brackets and working against the sides, and means on the brackets for detachable engagement with the sides to hold the brackets in overlapping relation to the latter.

2. An end gate for use with wagons having sides and comprising a gate body adapted to fit between the sides, hinge leaves fixed to the gate body at opposite ends thereof, substantially L-shaped brackets hinged to the leaves and adapted to swing to position to overlap the sides, adjustable means carried by the brackets and working against the sides, means on the brackets for detachable engagement with the sides to hold the brackets in overlapping relation to the latter, and spring clips carried by the leaves for detachably receiving the brackets when swung outwardly and inwardly towards the leaves.

3. An end gate for use with wagons having sides and comprising a gate body adapted to fit between the sides, hinge leaves fixed to the gate body at opposite ends thereof, substantially L-shaped brackets hinged to the leaves and adapted to swing to position to overlap the sides, adjustable means carried by the brackets and working against the sides, means on the brackets for detachable engagement with the sides to hold the brackets in overlapping relation to the latter, spring clips carried by the leaves for detachably receiving the brackets when swung outwardly and inwardly towards the leaves, and socketed members carried by the sides for coaction with the adjustable means.

4. An end gate for use with wagons having sides and comprising a gate body adapted to fit between the sides, hinge leaves fixed to the gate body at opposite ends thereof, substantially L-shaped brackets hinged to the leaves and adapted to swing to position to overlap the sides, adjustable means carried by the brackets and working against the sides, means on the brackets for detachable engagement with the sides to hold the brackets in overlapping relation to the latter, spring clips carried by the leaves for detachably receiving the brackets when swung outwardly and inwardly towards the leaves, and socketed members carried by the sides for coaction with the adjustable means, said gate body being formed in two sections adapted for swinging movement relative to each other.

In testimony whereof, I affix my signature hereto.

PETER VERDUGT.